US007391413B2

(12) United States Patent
Ono et al.

(10) Patent No.: US 7,391,413 B2
(45) Date of Patent: Jun. 24, 2008

(54) POSITIONAL INFORMATION OUTPUTTING DEVICE, POSITIONAL INFORMATION OUTPUTTING METHOD, AND SIGNAL PROCESSING METHOD

(76) Inventors: Kenichiro Ono, 3-30-2 Shimomaruko, Ohta-ku, Tokyo (JP); Takashi Tsunoda, 3-30-2, Shimomaruko, Ohta-ku, Tokyo (JP)

( * ) Notice: Subject to any disclaimer, the term of this patent is extended or adjusted under 35 U.S.C. 154(b) by 583 days.

(21) Appl. No.: 11/032,114

(22) Filed: Jan. 11, 2005

(65) Prior Publication Data

US 2005/0162405 A1 Jul. 28, 2005

(30) Foreign Application Priority Data

Jan. 23, 2004 (JP) ............................ 2004-015614

(51) Int. Cl.
*G06F 3/041* (2006.01)

(52) U.S. Cl. ...................... 345/173; 345/179; 178/18.01

(58) Field of Classification Search ......... 345/173-179; 178/18.01-18.04
See application file for complete search history.

(56) References Cited

U.S. PATENT DOCUMENTS

| | | | | |
|---|---|---|---|---|
| 5,706,035 | A | 1/1998 | Tsunoda et al. | 345/213 |
| 6,715,071 | B2 | 3/2004 | Ono et al. | 713/100 |
| 6,906,405 | B2 | 6/2005 | Ono | 257/680 |
| 2003/0001825 | A1 * | 1/2003 | Omura et al. | 345/173 |
| 2005/0162406 | A1 | 7/2005 | Ono | 345/173 |

FOREIGN PATENT DOCUMENTS

| | | |
|---|---|---|
| JP | 05-197507 | 8/1993 |
| JP | 2001-175376 | 6/2001 |

* cited by examiner

*Primary Examiner*—Richard Hjerpe
*Assistant Examiner*—Kimnhung Nguyen
(74) *Attorney, Agent, or Firm*—Fitzpatrick, Cella, Harper & Scinto

(57) ABSTRACT

A positional information outputting device comprising: a display screen; a positional information outputting circuit for outputting the information of a position designated on the display screen; and an output circuit for outputting a display signal for displaying a first image corresponding to a portion of an image, which can be formed with an image signal inputted, on a first area and a second area of the display screen. The positional information outputting circuit outputs, in case the inside of the first area on the display screen is designated, the information on the designated position, but does not output, in case the inside of the second area is designated, the information on the designated position.

6 Claims, 7 Drawing Sheets

POSITIONAL INFORMATION OUTPUTTING DEVICE, POSITIONAL INFORMATION OUTPUTTING METHOD, AND SIGNAL PROCESSING METHOD

BACKGROUND OF THE INVENTION

1. Field of the Invention

The present invention relates to a positional information outputting device using a touch panel, a pen or the like.

2. Description of the Related Art

As the display device such as a large-sized flat display, there have been heretofore practiced various types such as a liquid crystal type or a plasma type, which have been extended in their application ranges to not only the home TV but also presentations at offices.

When the display device is applied to preliminary arrangements or collaboration systems involving several persons in the office, on the other hand, editing operations are indispensable so that the display has to be combined position detecting means such as the touch panel or pen for designating a position on the display screen.

Thus, it is expected that conveniences are further increased, if a single display device can split its screen and can display identical contents in a face-to-face relation so that the displayed contents can be simultaneously confirmed by an operator and a facing person.

This split face-to-face display device is disclosed in Patent Publication 1. Moreover, a display system, in which a position in a split display device can be designated with a pen, is disclosed in Patent Publication 2.

Patent Publication 1: JP-A-05-197507

Patent Publication 2: JP-A-2001-175376

SUMMARY OF THE INVENTION

Let the scene (FIG. 2) be assumed, in which a clerk and a customer are seated in a face-to-face positional relation across a display device held in a horizontal position and a touch panel attached to the display device. In FIG. 2: numeral 1 designates a clerk; numeral 2 designates a customer; and an table-shaped article between them is a composite of the display device 22 and the touch panel 24 placed horizontally.

In this scene, the clerk 1 is preparing a written estimate, and the same estimate is displayed in the other split face by the split face-to-face display so that the customer 2 can observe the identical estimate at the same time.

Here is desired the state, in which only the clerk 1 can do an input through the touch panel so as to alter the contents in the written estimate and in which the input from the touch panel in the display screen on the side of the customer 2 is made invalid so that the customer 2 can observe the estimate but cannot rewrite it. However, no display system of the prior art can establish such state. Here is described the case, in which the two identical screens are displayed in different directions of 180 degrees by exemplifying the situation in which the clerk 1 and the customer 2 face each other. However, similar problems also occur even in case the display directions are made different other than 180 degrees or made identical.

An object of the invention is to provide a positional information outputting device and an arithmetic operation method, which can suppress an unintentional positional information input.

According to an aspect of the invention, there is provided a positional information outputting device comprising: a display screen; a positional information outputting circuit for outputting the information of a position designated on the display screen; and an output circuit for outputting a display signal for displaying a first image corresponding to a portion of an image, which can be formed with an image signal inputted, on a first area and a second area of the display screen, wherein the positional information outputting circuit outputs, in case the inside of the first area on the display screen is designated, the information on the designated position, but does not output, in case the inside of the second area is designated, the information on the designated position.

Here can be preferably adopted a configuration, in which in case the inside of the second area is designated, a signal uncorresponding one-to-one to the designated position is outputted. In a signal processing circuit utilizing the output of the positional information outputting circuit, there can be preferably adopted a configuration, in which in response to the signal uncorresponding one-to-one to the designated position, a signal for warning in response to the signal is issued.

According to another aspect of the invention, there is also provided a positional information outputting device comprising: a display screen; a positional information outputting circuit for outputting the information of a position designated on the display screen; an output circuit for outputting a display signal for displaying a first image corresponding to a portion of an image, which can be formed with an image signal inputted, on a first area and a second area of the display screen; and a control circuit for performing, in case the positional information outputted by the positional information outputting circuit is the information indicating that the inside of the first area on the display screen is designated, a predetermined signal processing according to the positional information, but for unperforming, in case the positional information outputted by the positional information outputting circuit is the information indicating that the inside of the second area on the display screen is designated, the predetermined signal processing according to the positional information.

Here can be preferably adopted a configuration, in which in case the positional information outputted by the positional information outputting circuit is the information indicating that the inside of the second area on the display screen, the control circuit generates a signal for warning.

According to still another aspect of the invention, there is provided a positional information outputting method for a positional information outputting device including: a display screen; a positional information outputting circuit for outputting the information of a position designated on the display screen; and an output circuit for outputting a display signal for displaying a first image corresponding to a portion of an image, which can be formed with an image signal inputted, on a first area and a second area of the display screen, wherein the positional information outputting circuit outputs, in case the inside of the first area on the display screen is designated, the information on the designated position, but does not output, in case the inside of the second area is designated, the information on the designated position.

Especially in this aspect of the invention, there can be preferably adopted a configuration, in which in case the inside of the second area is designated, a signal uncorresponding one-to-one to the designated position is outputted.

According to a further aspect of the invention, there is provided a signal processing method for performing a signal processing according to the positional information outputted by a positional information outputting device including: a display screen; a positional information outputting circuit for outputting the information of a position designated on the display screen; and an output circuit for outputting a display signal for displaying a first image corresponding to a portion of an image, which can be formed with an image signal inputted, on a first area and a second area of the display screen, wherein in case the positional information outputted by the positional information outputting circuit is the information indicating that the inside of the first area on the display screen is designated, a predetermined signal processing according to the positional information is performed, and wherein in case the positional information outputted by the positional information outputting circuit is the information indicating that the inside of the second area on the display screen is designated, the predetermined signal processing according to the positional information is not performed.

Especially in this aspect of the invention, there can be preferably adopted a configuration, in which in case the positional information outputted by the positional information outputting circuit is the information indicating that the inside of the second area on the display screen, a signal for warning is generated.

The invention can prevent a careless inputting operation.

DETAILED DESCRIPTION OF THE PREFERRED EMBODIMENTS

The best mode of embodiment of the invention will be illustratively described in detail with reference to the accompanying drawings. However, the sizes, materials, shapes and relative arrangements of the components described in the embodiments are not intended to be limited by the components described, so long as they are not specifically described. Moreover, the display direction at the time when an identical screen is displayed in a plurality of areas will be exemplified as an especially preferable example by a facing display, but the example should not be limited to the facing display. The display can be set in various directions including a display of an identical direction. However, the invention can be preferably applied especially to the case, in which a plurality of identical screens are display in different display directions.

First Embodiment

Figure 1:
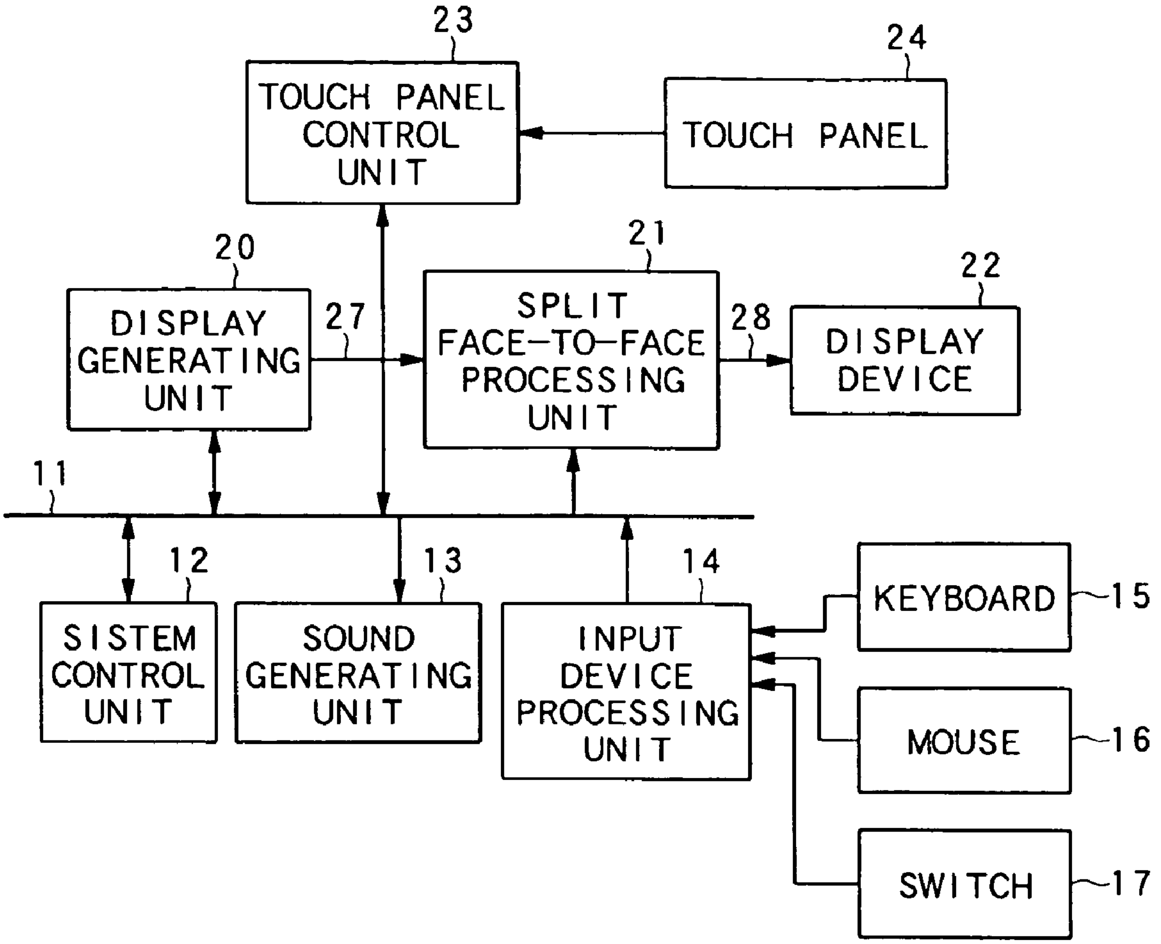
FIG. 1 is a configuration diagram of a display system according to a first embodiment.

The first embodiment will be described with reference to FIG. 1 to FIG. 6. FIG. 1 shows a configuration diagram of a display system according to the first embodiment.

In FIG. 1, reference numeral 11 designates a bus, with which the individual blocks are connected. Numeral 12 designates a system control unit controlling the entire system and corresponding to a control circuit. The system control unit 12 includes a CPU and a memory. Numeral 13 designates a sound generating unit for generating a warning sound when instructed by the system control unit 12.

Numeral 15 designates a keyboard, and numeral 16 designates a mouse. Numeral 17 designates a switch for setting a display mode, by which a user switches an entire display and a split face-to-face display. An input device processing unit 14 transmits pieces of information from the individual input devices to the system control unit 12 via the bus 11. Knowing the display mode being set, the system control unit 12 sets the display mode in a split face-to-face processing unit 21 and a touch panel control unit 23.

Numeral 20 designates a display generating unit for generating the contents to be displayed in response to the instruction of the system control unit 12. The numeral 21 designates the split face-to-face processing unit corresponding to an output circuit, and its role will be described hereinafter. Numeral 22 designates a display device having a display screen which displays display data. The numeral 23 designates the touch panel control unit for transmitting positional information from a touch panel 24 via the bus 11 to the system control unit 12. The numeral 24 designates the touch panel for detecting the position designated by the user, as the positional information. This touch panel 24 can employ the well-known configuration such as the ultrasonic surface elastic wave type, the resistive film type, the electrostatic capacity type or the infrared scanning type. The touch panel 24 and the touch panel control unit 23 correspond to a positional information outputting circuit.

Figure 2:
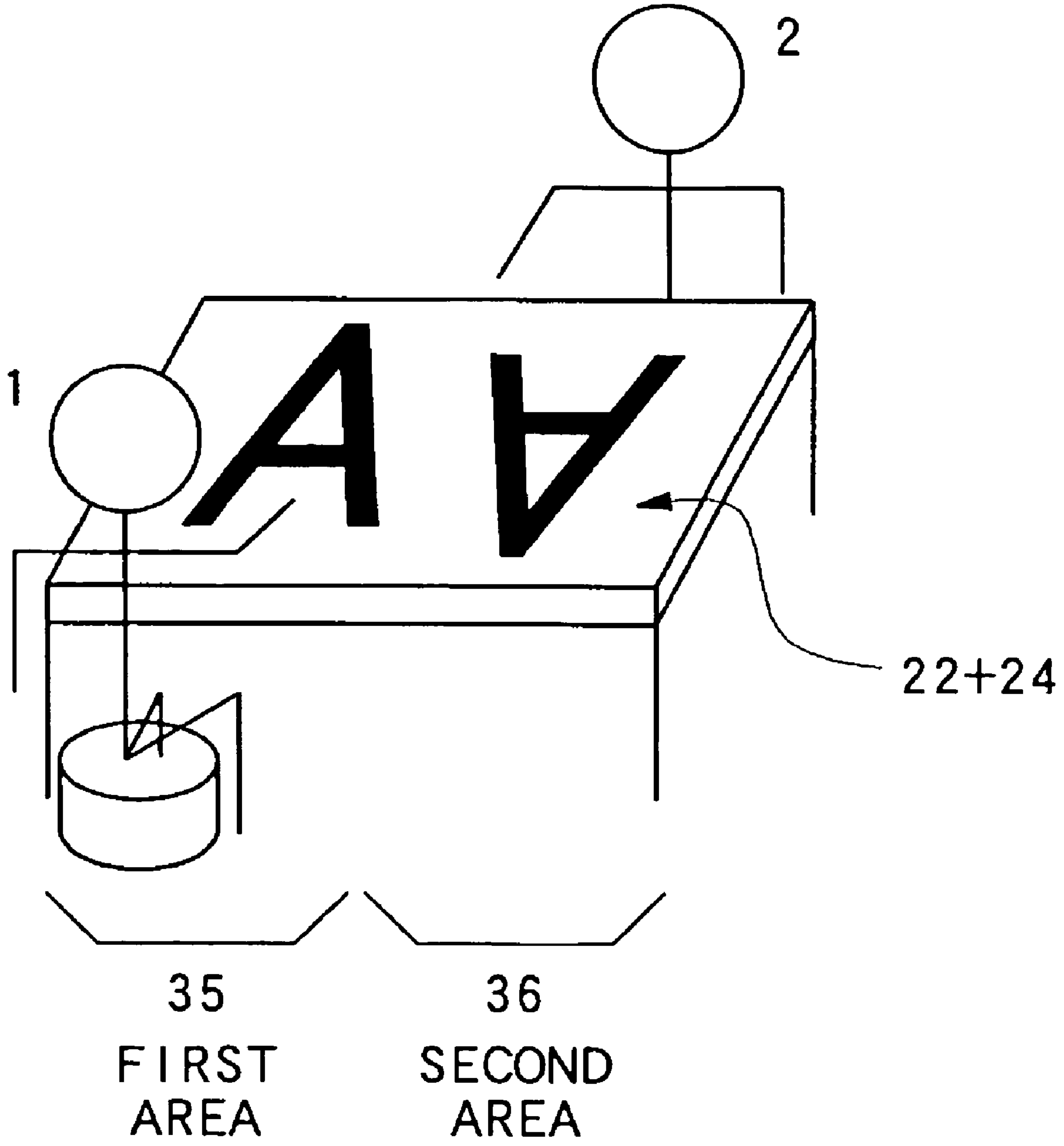
FIG. 2 is a diagram showing the situation, in which the display system according to the first embodiment is used.

Let the case (FIG. 2) be assumed, for example, in which a clerk and a customer facing each other are seated across the display device placed horizontally and the touch panel attached to the display device. In FIG. 2: numeral 1 designates a clerk; numeral 2 designates a customer; and an table-shaped article between them is a composite of the display device 22 and the touch panel 24 placed horizontally.

Figure 3:
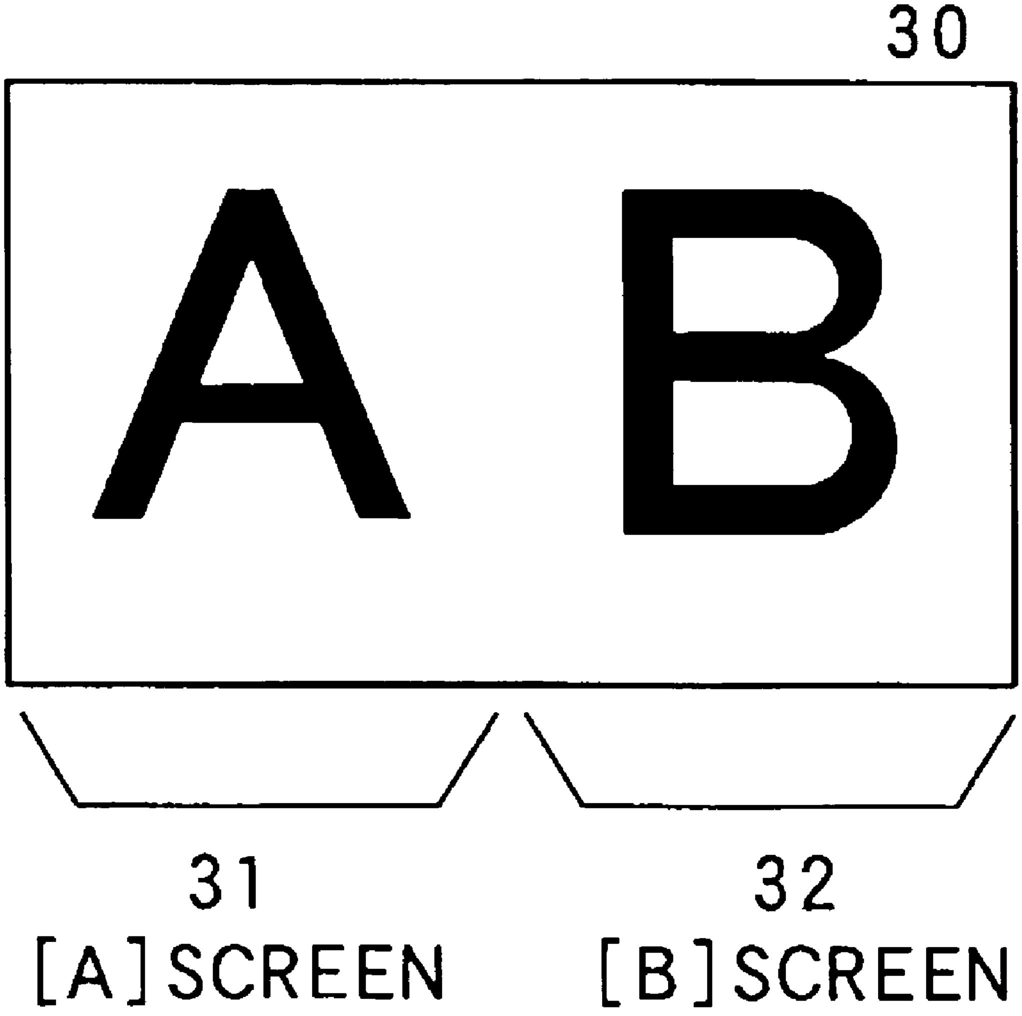
FIG. 3 shows an example of a screen taken from a display generation unit of the display system according to the first embodiment.

It is also assumed that the display generating unit 20 generates the contents, as shown in FIG. 3, in response to the instruction from the system control unit 12. Here are further assumed that an [A] screen 31 is generated on the left half whereas a [B] screen 32 is generated on the right half. These contents are transmitted to the split face-to-face processing unit 21 via a signal line 27 as the output of the display generating unit 20.

When the display mode is set from the system control unit 12 so that the entire screen display mode is recognized, the split face-to-face processing unit 21 feeds the display data from the display generating unit 20 as they are to a signal line 28. When the split face-to-face display mode is recognized, the display is split into just left and right halves. The [A] screen 31 or the left half of the display data from the display generating unit 20 is used as it is as the left half display data, and the [A] screen 31 is turned 180 degrees into the right half display data. By this processing, there can be outputted display signals for displaying a first image (corresponding to the left half of FIG. 3) corresponding to a portion of the image (FIG. 3), which can be formed with the image signals inputted from the display generating unit 20, simultaneously on the display area on the left screen side or the first area and on the display area on the right screen side or the second area.

Figure 4:
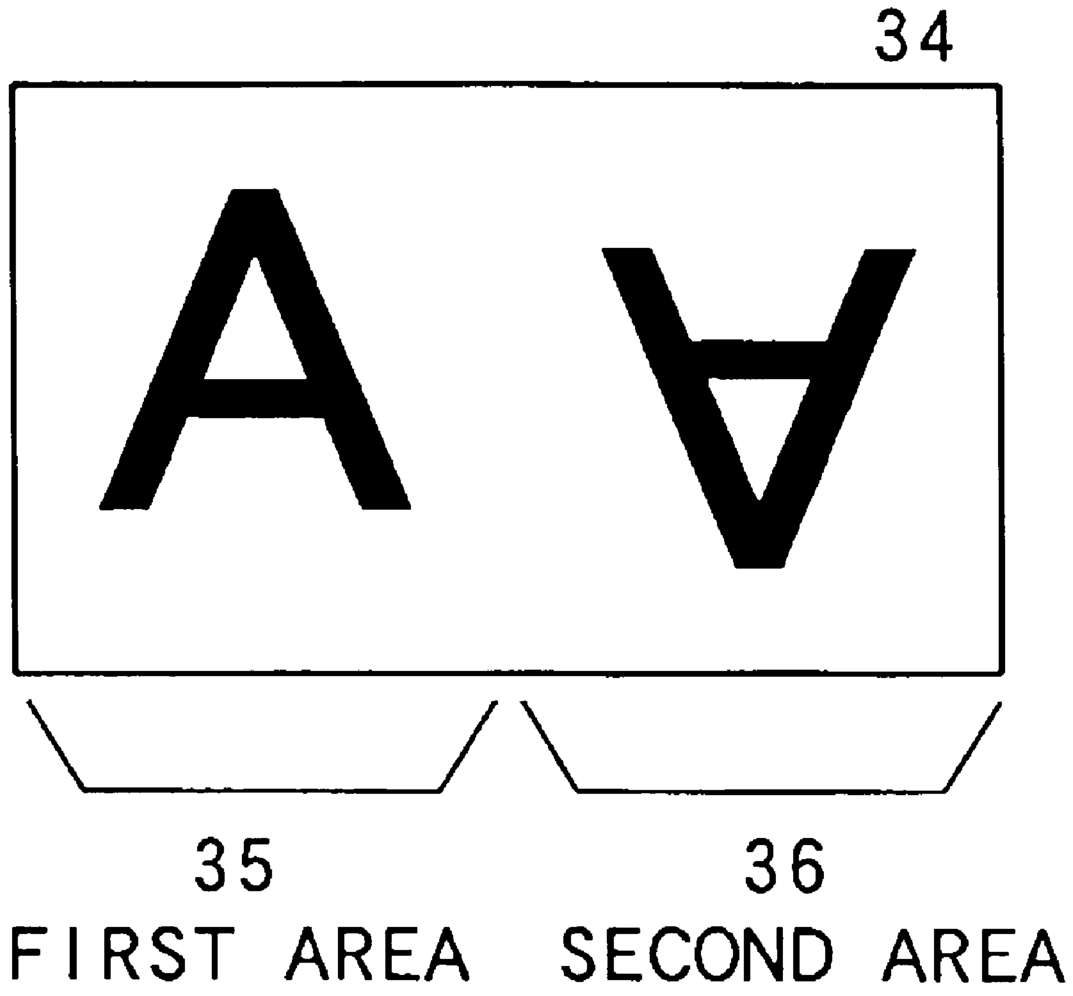
FIG. 4 is a screen example of the display system according to the first embodiment.

The behavior of the output signals of the signal line 28 from the split face-to-face processing unit 21 is shown in FIG. 4. Here, the [A] screen on the left half is used as it is for a first area 35 and is turned 180 degrees on the right half to synthesize a second area 36, and the two screens are displayed in the display device 22.

Figure 5:
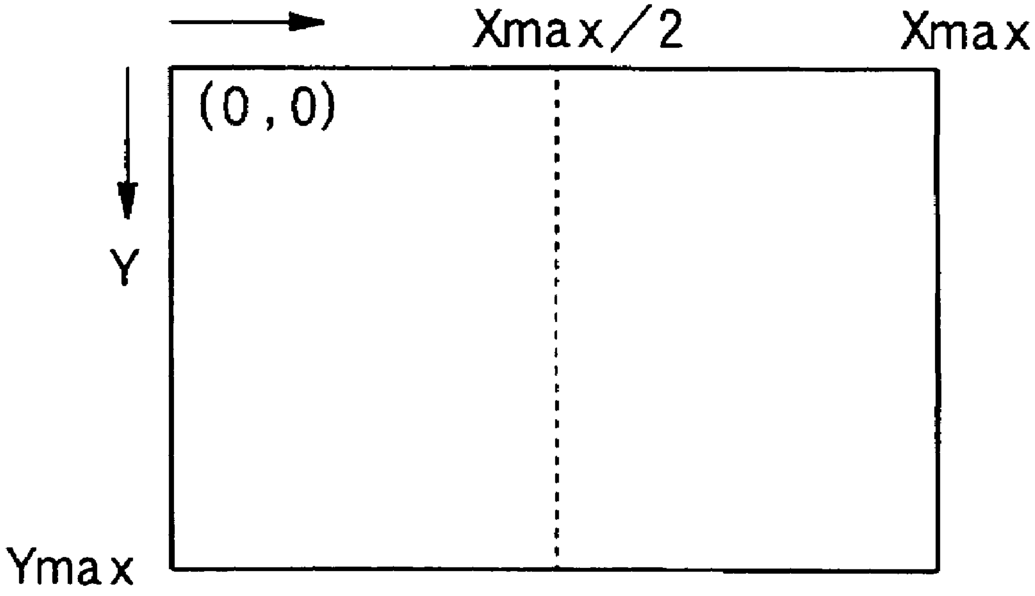
FIG. 5 is an example of coordinates of a touch panel of the display system according to the first embodiment.

The touch panel 24 has its input coordinate position corresponding to the display area of the display device 22, and outputs the coordinate position of a displayed point when this point is touched. As shown in FIG. 5, a left upper coordinate is expressed with an XY coordinate system by (0, 0) and a right lower coordinate is expressed by (Xmax, Ymax). The positional information at the time when the user touches the touch panel 24 is transmitted to the touch panel control unit 23.

Figure 6:
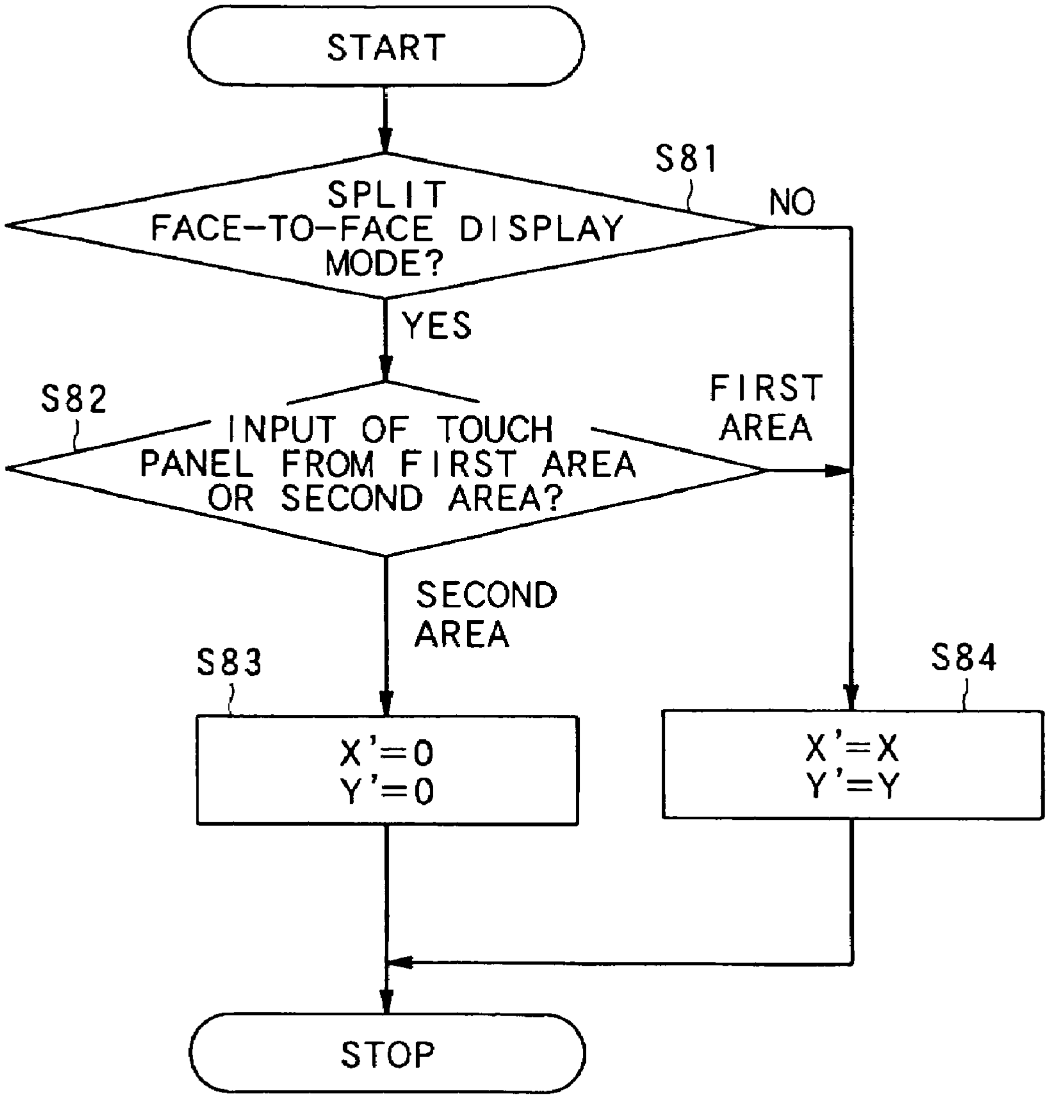
FIG. 6 is a flow chart of the display system according to the first embodiment.

The processing method at this time will be described with reference to the flow chart of FIG. 6. The touch panel control unit 23 is informed of the display mode and decides (S81) whether or not the mode is the split face-to-face display mode. The routine advances to S82 if yes but to S84 if no.

At S82, it is decided (S82) whether the input from the touch panel 24 belongs to the first area or the second area. Specifically, the decision is made depending on whether or not the inputted X-coordinate is larger than Xmax/2. The routine advances to S83, in case the input belongs to the second area if larger, but to S84 in case the input belongs to the first area if smaller.

At S83, the value "0" is outputted for both the values of the X-direction and the Y-direction inputted, to the bus 11 (S83).

At S84, an input value X and an input value Y inputted are outputted for the values in the X-direction and in the Y-direction to the bus 11 (S84).

In summary, for the touch panel input coordinates (X, Y), the output coordinates (X', Y') from the touch panel control unit 23 are, as follows:

1) In the case of the split face-to-face display mode, a) $0 \leqq X \leqq Xmax/2$ (the left half), $$X'=X,$$

and $$Y'=Y; \text{ and}$$

b) $Xmax/2 < X \leqq Xmax$ (the right half), $$X'=0,$$

and $$Y'=0.$$

2) In the case of the full screen display, $$X'=X,$$

and $$Y'=Y.$$

When the inside of the second area 36 is designated, as described above, it is possible not to output the information corresponding one-to-one to the designated position. In case the second area is designated, therefore, it is possible to make the signal processing responding to that designation unperformed, in the circuit for the signal processing with the information from a positional information outputting circuit. In case the first area is designated, a predetermined signal processing for displaying a pointer symbol (e.g., an arrow) at a position corresponding to the designated position can be executed according to the coordinate information of that designated position.

In the mode thus far described, the value of the X-coordinate inputted in the split face-to-face display mode from the touch panel 24 by the touch panel control unit 23 is discriminated to decide whether or not the coordinate information is to be outputted from the position information outputting circuit. However, there can be adopted configurations. In one configuration, not depending on whether the designated position belongs to the first area or the second area, the coordinate information is outputted from the positional information outputting circuit. When a predetermined signal processing is performed on the basis of the coordinate information in either the system control unit 12 for the signal processing on the basis of the coordinate information from the positional information outputting circuit or another circuit, the circuit for that signal information recognizes that the coordinate information from the position information outputting circuit indicates the position in the second area. In this case, the predetermined signal processing according to that coordinate information is inhibited. With this configuration, too, in case the first area is touched, the pointer symbol is displayed at the touched position, but in case the second area is touched, the pointer symbol is not displayed at that touched position. With another configuration, in case it is recognized that the position in the second area is indicated when the mode is in the split face-to-face display mode, any signal is not outputted from the position information outputting circuit, or the coordinate information is outputted like the aforementioned mode from the positional information outputting circuit, but a signal may be outputted by adding to it the information for inhibiting the predetermined signal processing with the signal containing that coordinate information.

In the aforementioned mode, on the other hand, the left [A] screen is used as the first area, but the positional information from the coordinate in the area of the [B] screen is made invalid. In another processing, on the contrary, the right [B] screen may be used as the first area and displayed in the face-to-face relation while making invalid the positional information from the coordinate in the area of the [A] screen.

In the mode thus far described, moreover, the positional information outputting device adopts the configuration having the touch panel, but can attain similar effects by a similar processing with a pointing device such as a mouse or a pen. As the configuration for designating the position on the screen, there can be used one other than that, in which a finger or a designating member such as one having a pen shape is brought to contact or close to the screen. However, it is desired to use the configuration, in which the finger or the designating member such as one having the pen shape contacts or comes close to the screen.

Second Embodiment

Figure 7:
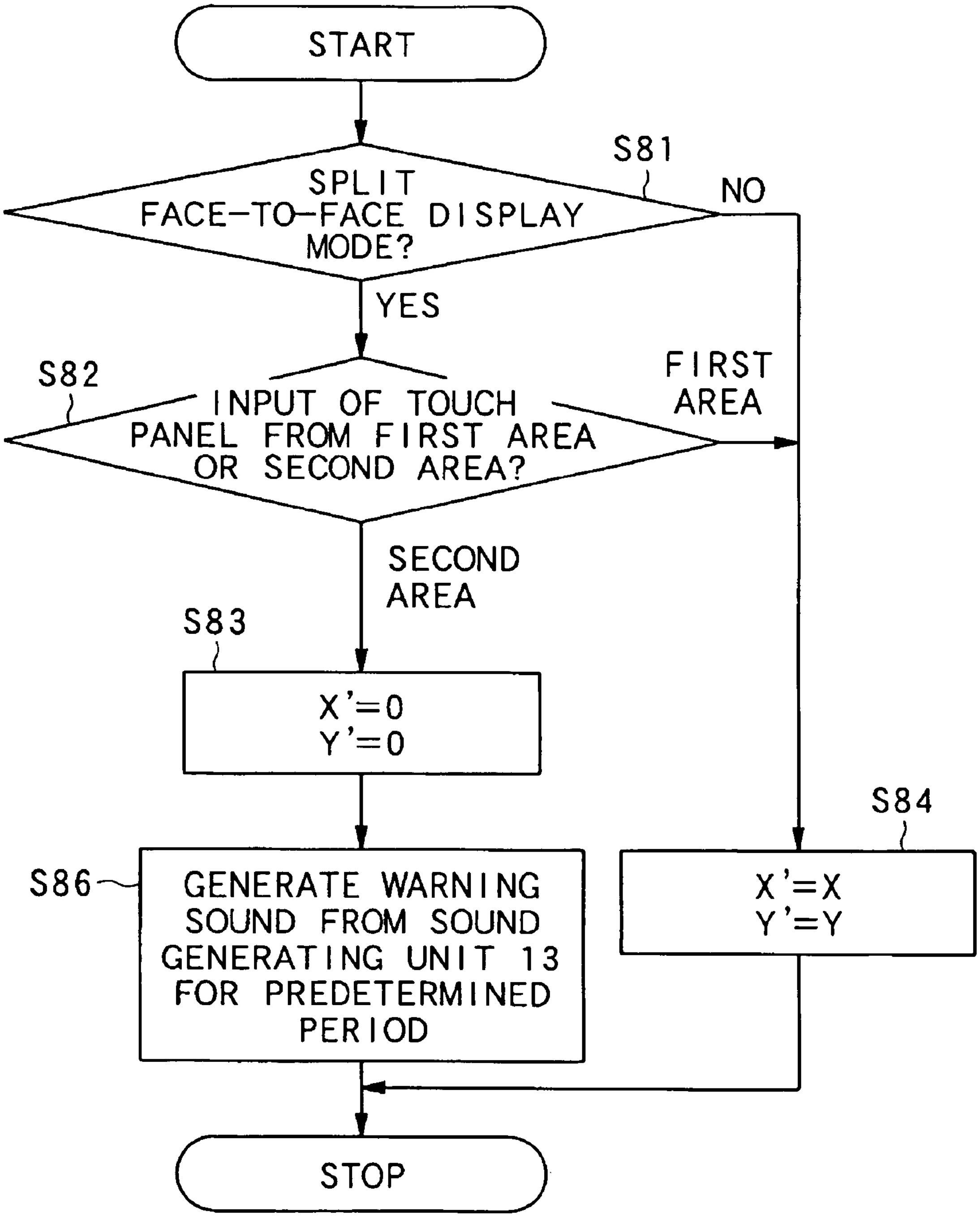
FIG. 7 is a flow chart of a display system according to a second embodiment.

FIG. 7 shows the second embodiment. The system configuration is identical to that of the first embodiment. Therefore, the description of the common components is omitted by designating them by the common reference numerals.

The processing routine of the second embodiment is shown in FIG. 7. The operations to S83 are omitted because they are identical to those of the first embodiment.

At S83, the value "0" is outputted to the bus 11 while indicating that the positional information on the inputted values of the X-direction and the Y-direction is invalid (S83). This implies that the positional information invalidating signal indicating the positional information is invalid is outputted as the signal failing to correspond one-to-one to the designated position. Then, the routine advances from S83 to S86, at which the system control unit 12 is based on the positional information invalidating signal to issue a signal for generating a warning. On the basis of this warning generating signal, a warning sound is generated (S86) for a predetermined time period from the sound generating unit 13.

Thus, when the inside of the second area 36 is designated, the information on the designated position is not outputted, but the warning sound is issued at the same time. It is, therefore, possible to inform the user of the fact that the positional information inputted from the second area 36 receiving no positional information is invalid. Here, the warning generating method is not limited to the warning sound but can be exemplified by various methods such as a warning display.

This application claims priority from Japanese Patent Application No.2004-015614 filed Jan. 23, 2004, which is hereby incorporated by reference herein.

What is claimed is:

1. A display device comprising:

a display screen including a first display area and a second display area;

a point input reception circuit that receives a position pointing input which points a position on the display screen;

a display signal output circuit that outputs a display signal for displaying an inputted image on the display screen; and a control circuit that controls a signal processing based on the pointed position, wherein in a first display mode, the display signal output circuit outputs a display signal for displaying the inputted image on the entire display screen, and the control circuit performs a predetermined signal processing based on the pointed position of the display screen, and wherein in a second display mode, the display signal output circuit outputs a display signal for displaying the inputted image on the first and second display areas, respectively, and the control circuit performs the predetermined signal processing based on the pointed position if the pointed position is inside of the first display area, but does not perform the predetermined signal processing if the pointed position is inside of the second display area.

2. A display device according to claim 1, wherein the predetermined signal processing is a processing for displaying predetermined display data on the pointed position of the display screen.

3. A display device according to claim 1, further comprising a warning generating circuit that generates a signal for warning if the pointed position is inside of the second display area in the second display mode.

4. A signal processing method for a display device having a display screen including a first display area and a second display area, the method comprising the steps of:

setting a display mode;

displaying an inputted image on the display device;

receiving a position pointing input which points a position on the display screen; and controlling a signal processing based on the pointed position, wherein in a first display mode, the inputted image is displayed on the entire display screen and predetermined signal processing is performed based on the pointed position, and wherein in a second display mode, the inputted image is displayed on the first and second display areas of the display screen, respectively, and the predetermined signal processing is performed based on the pointed position if the pointed position is inside of the first display area, but the predetermined signal processing is not performed if the pointed position is inside of the second display area.

5. A signal processing method according to claim 4, wherein the predetermined signal processing is a processing for displaying predetermined display data on the pointed position of the display screen.

6. A signal processing method according to claim 4, further comprising the step of generating a signal for warning if the pointed position is inside of the second display area in the second display mode.

* * * * *

UNITED STATES PATENT AND TRADEMARK OFFICE

CERTIFICATE OF CORRECTION

PATENT NO. : 7,391,413 B2
APPLICATION NO. : 11/032114
DATED : June 24, 2008
INVENTOR(S) : Kenichiro Ono et al.

It is certified that error appears in the above-identified patent and that said Letters Patent is hereby corrected as shown below:

ON THE TITLE PG:

Insert Item -- (73) Assignee: Canon Kabushiki Kaisha, Tokyo (JP) --; and

Item (76) Inventors: “Kenichiro Ono, 3-30-2 Shimomaruko, Ohta-ku, Tokyo (JP); Takashi Tsunoda, 3-30-2, Shimomaruko, Ohta-ku, Tokyo (JP)” should read Item -- (75) Inventors: Kenichiro Ono, Kanagawa-ken (JP); Takashi Tsunoda, Kanagawa-ken (JP) --.

DRAWINGS:

Sheet 1, FIG. 1, Box 12, “SISTEM” should read -- SYSTEM --.

Signed and Sealed this

Twenty-second Day of December, 2009

David J. Kappos

*Director of the United States Patent and Trademark Office*